United States Patent [19]

Bossi et al.

[11] Patent Number: 4,656,240
[45] Date of Patent: Apr. 7, 1987

[54] ELECTRICALLY CONDUCTIVE POLYMER BASED ON POLYAZOMETHINE AND PROCESS FOR PREPARING SAME FROM DIKETONE AND DIAMINE

[75] Inventors: Furio Bossi; Cornelio Caldo, both of Terni, Italy

[73] Assignee: Montedison, S.p.A., Milan, Italy

[21] Appl. No.: 683,488

[22] Filed: Dec. 19, 1984

[30] Foreign Application Priority Data

Dec. 22, 1983 [IT] Italy ............................... 24321 A/83

[51] Int. Cl.⁴ .............................................. C08G 73/00
[52] U.S. Cl. .................... 528/229; 252/500; 525/471; 528/127; 528/128; 528/227; 528/245; 528/265
[58] Field of Search ............... 528/229, 227, 265, 127, 528/128, 245; 252/500; 525/471

[56] References Cited

U.S. PATENT DOCUMENTS 4,379,896 4/1983 Robinson et al. .................. 528/229

*Primary Examiner*—Harold D. Anderson
*Attorney, Agent, or Firm*—Stevens, Davis, Miller & Mosher

[57] ABSTRACT

Polyazomethines having a high electrical conductivity obtained by polycondensation reaction of bicarbonyl compounds with aromatic diamines of formula: $H_2N-Ar-CH_2-Ar-NH_2$, in which Ar is an aryl group optionally substituted, and by subsequent oxidation capable of transforming at least in part, the methylene group of the amine into a carbonyl group.

The present invention relates to new electrically conductive polymers belonging to the class of the polyazomethines having high conductivity values, and to the process for preparing the same.

11 Claims, No Drawings

ELECTRICALLY CONDUCTIVE POLYMER BASED ON POLYAZOMETHINE AND PROCESS FOR PREPARING SAME FROM DIKETONE AND DIAMINE

BACKGROUND OF THE INVENTION

It is known in the literature to use, in the field of the conductive polymers, polyazomethines obtained by polycondensation reaction of bicarbonyl compounds, such as aromatic diketones and diamines. Polyazomethines having the unit:

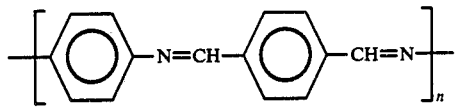

show conductivity values of the order of $10^{-13}$ ohm$^{-1}$ cm$^{-1}$ at a temperature of 25° C. However, these conductivity values are too low to permit the practical utilization of the polyazomethines in the field of the electrically conductive polymers.

In Journal Applied Polymer Science 20, 1985, (1982) there are described polyazomethines obtained by polycondensation of 4,4'-diacetyldiphenylether, utilized as bicarbonyl compound, with aliphatic or aromatic diamines.

The electrical conductivity values measures at 30° C. are in the range of $1.63 \cdot 10^{-16}$ to $3.55 \cdot 10^{-11}$ ohm$^{-1}$ cm$^{-1}$. The conductivity values at a temperature of 25° C. are slightly lower than the above-cited values.

The above conductivity values are still too low to permit the use in practice of the polyazomethines in the field of the electrically conductive polymers.

In the development of the polyazomethines, the necessity was felt of increasing the electrical conductivity in order to permit their practical utilization.

THE PRESENT INVENTION

We have found, surprisingly, that with the process of the present invention it is possible to prepare a new type of polyazomethines having electrical conductivity values about a hundred times higher than those known in the art.

The polyazomethines forming the object of the present invention are obtained by polycondensation reaction between a bicarbonyl compound with an aromatic diamine having the general formula:

H$_2$N—Ar—CH$_2$—Ar—NH$_2$ in which Ar is an aryl group, optionally substituted, and by subsequent oxidation in order to transform at least a part of the methylene groups of the diamine into carbonyl groups.

The bicarbonyl compounds which can be used in the polycondensation reaction are the diketones and the dialdehydes.

The utilizable bicarbonyl compounds are either aliphatic or aromatic.

The preferred compounds are glyoxal, 4,4'-diacetylphenylmethane and 4,4'-diacetyldiphenylether.

The aromatic diamines which are utilizable and preferred according to the process of the invention are 4,4'-diaminodiphenylmethane, 2,4-diaminodiphenylmethane and mixtures thereof.

However, it is possible to use aromatic diamines containing substituents in the aromatic ring such as, for example, alkyl groups.

Examples of these diamines are 4,4'-diamino-2,2'-dimethyldiphenylmethane, 4,4'-diamino-2,2'-di-n-octyldiphenylmethane and so on.

The polycondensation reaction is carried out at temperatures ranging from 50° to 200° C. and for times depending on the reactivity of the reagents. Generally, the time ranges from 10 minutes to 20 hours.

Polycondensation can be conducted in the presence or in the absence of solvents.

Employable solvents are, for example, water, alcohols, hydrocarbons, ethers. It is essential that the solvent used does not contain carbonyl groups or aminic groups as these groups would interfere with the polycondensation reaction.

The preferred solvents are water and alcohols such as, for example, amyl alcohol and butyl alcohol.

In the polycondensation reaction, the molar ratios between diamine and bicarbonyl compound range from 1:0.9 to 1:1.2. Molar ratios of 1:1 are preferred.

As already mentioned hereinabove, the polyazomethines obtained by polycondensation are then subjected to an oxidation reaction in order to transform the methylene groups of the diamines, in whole or in part, into carbonyl groups.

The oxidation reaction is carried out by using any oxidizing agent.

Examples of oxidizing compounds are chromic anhydride and the mixture consisting of the dichromate of an alkaline metal with sulphuric acid.

The oxidation reaction is carried out at temperatures ranging from room temperature to 150° C. and for times of from 10 minutes to 5 hours.

The polyazomethines prepared according to the process of this invention are characterized by an inherent viscosity value determined at 25° C. in solutions at 0.5% by weight of polyazomethines in chloroform, by the resistivity value in ohm cm determined according to ASTM standard D-257-66/72, at a temperature of 25° C. The presence of the carbonyl group, which is contained in the polyazomethines and derives from the oxidation of the methylene group contained in the diamines, was determined by infrared spectrography (I.R.).

The polyazomethines obtained show electrical conductivity values a hundred times higher than those known in the art, and they can be used as usual electrically conductive materials, disc supports, supports for integrated circuits and as electronic materials in general.

The electrical conductivity of the polyazomethines of this invention can be further increased by addition of doping agents. Such agents are added in the amounts and according to techniques known in the literature.

Useful doping agents are, for example, indium, iodine, antimony pentafluoride or pentachloride, boron trifluoride or trichloride, ammonia, methylamine, tetracyanoquinodimethane.

Generally, the amount of doping agent ranges from 0.1 g to 20 g per Kg of polymer.

The following examples are given only for illustrative purposes and are not intended to be limiting.

EXAMPLE 1

Preparation of polyazomethine by polycondensation reaction.

Into a three-neck flask having a capacity of 1 l, equipped with a stirrer, a thermometer and a reflux cooler, there were introduced:

4,4'-diaminodiphenylmethane: 39.6 g (0.2 moles)
4,4'-diacetyldiphenylether: 40.8 g (0.2 moles)
amyl alcohol: 400 ml.

The whole was heated at reflux for 8 hours. A sample is drawn from the slurry for analyzing the polyazomethine obtained. The formed polyazomethine was filtered and was dried at 60° C. at a reduced pressure. The polymer appeared as a brown solid having:

$\eta_{inh}$, at 25° C., in a solution at 0.5% by weight in chloroform: 0.04 dl/g
resistivity at 25° C. (ohm$\times$cm): $5.00\times10^{11}$
conductivity at 25° C. (ohm$^{31}$$\times$cm$^{-1}$): $0.20\times10^{-11}$ Preparation of the oxidized polyazomethine.

To the slurry prepared as above there were added, for oxidizing the methylene groups of the polyazomethine:

potassium dichromate: 60 g
concentrated sulphuric acid: 80 g.

The mass was heated at reflux for 30 minutes, then it was neutralized with an aqueous solution of sodium carbonate. The aqueous solution, green due to chromic acid, was separated in a separatory funnel, and the residue was evaporated under reduced pressure.

A brown solid was obtained which, on infrared examination, exhibited the bands which are characteristic of the carbonyl groups, and the properties of which were as follows:

resistivity at 25° C. (ohm$\times$cm): $1.80\times10^{9}$
conductivity at 25° C. (ohm$^{-1}$$\times$cm$^{-1}$): $0.60\times10^{-9}$.

EXAMPLE 2

Preparation of polyazomethine by polycondensation reaction.

Into a glass, three-neck, 1-liter flask equipped with a stirrer, a thermometer and a reflux cooler, there were introduced:

4,4'-diaminodiphenylmethane: 39.6 g (0.2 moles)
glyoxal: 11.6 g (0.2 moles)
water: 40 ml.

It was heated at reflux for 2 hours. A sample is drawn from the slurry for analyzing the polyazomethine obtained. The formed polyazomethine was filtered and was dried at 60° C. under reduced pressure.

The polymer was in the form of a brown solid having the following properties:

resistivity at 25° C. (ohm$\times$cm): $4.00\times10^{14}$
conductivity at 25° C. (ohm$^{-1}$$\times$cm$^{-1}$): $0.25\times10^{-14}$.

Preparation of the oxidized polyazomethine.

To the slurry as prepared above, and cooled down to room temperature, there was added on oxidizing solution consisting of:

potassium dichromate: 60 g
concentrated sulphuric acid: 80 g.

The whole was heated at reflux for 30 minutes, then neutralized with an aqueous solution of sodium carbonate. It was filtered, washed with water and dried at 60° C., under reduced pressure.

A brown solid was obtained which, on I.R. examination, exhibited the bands typical of the carbonyl groups and which had the following properties:

resistivity at 25° C. (ohm$\times$cm): $2.00\times10^{11}$
conductivity at 25° C. (ohm$^{-1}$$\times$cm$^{-1}$): $0.50\times10^{-11}$.

EXAMPLE 3

Into a three-neck pyrex flask, equipped with a stirrer, a thermometer and a reflux cooler, there were introduced:

oxidized polyazomethine, prepared according to Example 2: 50 g
methanol: 300 ml
methanol solution at 1% by weight of tetracyanoquinodimethane: 50 ml.

It was stirred for 30 minutes at room temperature after which the solvent was evaporated under reduced pressure.

A brown solid was obtained, which showed the following properties:

resistivity at 25° C. (ohm$\times$cm): $2.80\times10^{8}$
conductivity at 25° C. (ohm$^{-1}$$\times$cm$^{-1}$): $0.36\times10^{-8}$.

What is claimed is:

1. A polyazomethine having high electrical conductivity and obtained by polycondensation of a diketone with an aromatic diamine of formula: H$_2$N—AR—CH$_2$—Ar—NH$_2$, in which Ar is an arylene group selected from the group consisting of arylene radicals and alkyl-substituted arylene radicals, to produce a polyazomethine having methylene groups, and by subsequent oxidation of at least part of the methylene groups to carbonyl groups.

2. A polyazomethine obtained according to claim 1, in which the diketone is selected from the group consisting of 4,4'-diacetyldiphenylmethane and 4,4'-diacetyldiphenylether.

3. A polyazomethine obtained according to claim 1, in which the diamine is selected from the group consisting of 4,4'-diaminodiphenylmethane and 2,4-diaminodiphenylmethane.

4. A polyazomethine obtained according to claim 1, in which the oxidation is carried out with an oxidizer selected from the group consisting of chromic anhydride and mixtures of alkaline metal dichromate and sulphuric acid.

5. A polyazomethine obtained according to claim 1, and further characterized in containing at least one doping agent.

6. A polyazomethine obtained according to claim 5, in which at least one doping agent is selected from the group consisting of iodine, antimony pentafluoride, antimony pentachloride, boron trifluoride, boron trichloride, ammonia, methylamine and tetracyanoquinodimethane.

7. A polyazomethine obtained according to claim 1, the diamine being 4,4'-diaminodiphenylmethane and the diketone being 4,4'-diacetyldiphenylether.

8. A process for preparing a polyazomethine characterized by high electrical conductivity, which process comprises subjecting a diketone and an aromatic diamine of formula H$_2$N-AR-CH$_2$-AR-NH$_2$ in which Ar is selected from the group consisting of arylene radicals and alkylsubstituted arylene radicals to polycondensation, in the presence of a solvent, at a temperature from 50° C. to 200° C., to produce a polyazomethine having methylene groups, and subsequently subjecting at least part of the methylene groups of the polyazomethine thus obtained to oxidation with an oxidizing agent which is a mixture of alkaline metal dichromates and sulphuric acid, at temperatures in the range from room temperature to 150° C.

9. The process of claim 8, in which the diketone is selected from the group consisting of 4,4'-diacetyldiphenylmethane and 4,4'-diacetyldiphenylether.

10. The process of claim 9, in which the diamine is selected from the group consisting of 4,4'-diaminodiphenylmethane and 2,4-diaminodiphenylmethane.

11. The process of claim 8, in which the oxidizing agent is a mixture of potassium dichromate and sulphuric acid.

* * * * *